United States Patent [19]

Spitz et al.

[11]  4,131,661

[45]  Dec. 26, 1978

[54] WASTE ASBESTOS RECOVERY FROM PRODUCTION OF ASBESTOS PRODUCTS

[75] Inventors: Edward K. Spitz, Hanahan; Lawton E. Cox, Johns Island, both of S.C.

[73] Assignee: Raybestos-Manhattan, Inc., Trumbull, Conn.

[21] Appl. No.: 785,363

[22] Filed: Apr. 7, 1977

[51] Int. Cl.$^2$ .................... B29H 19/00; D01F 13/00
[52] U.S. Cl. .................................... 264/38; 162/155; 264/183
[58] Field of Search ................. 264/38, 183; 162/5, 162/155

[56] References Cited

U.S. PATENT DOCUMENTS

| | | | |
|---|---|---|---|
| 1,214,931 | 2/1917 | Leduc et al. | 264/38 |
| 1,701,110 | 2/1929 | Hofmann | 264/38 |
| 2,972,221 | 2/1961 | Wilke et al. | 264/184 |
| 3,318,983 | 5/1967 | Hovis et al. | 264/38 |
| 3,354,028 | 11/1967 | Illingworth et al. | 162/5 |

Primary Examiner—Jay H. Woo
Attorney, Agent, or Firm—Gary, Juettner & Pyle

[57]  ABSTRACT

Waste asbestos generated from a production process utilizing a surfactant as the dispersant and a coagulant as a solidifying agent is recovered for reprocessing by treating the waste with an inorganic acid to react with the precipitated surfactant and solubilize the precipitating ions. The precipitating ions are removed by washing. The insoluble residue, containing asbestos and the surfactant is mixed and reacted with an alkali to form a dispersion of asbestos that may be reprocessed by conventional methods.

6 Claims, No Drawings

WASTE ASBESTOS RECOVERY FROM PRODUCTION OF ASBESTOS PRODUCTS

BACKGROUND OF THE INVENTION

It is well known that macroscopic aggregates or bundles of asbestos, especially of the chrysotile variety, can be converted into a stable dispersion or colloidal form by treatment with an aqueous solution of organic detergent surface active agent. Suitable types of surfactants for this procedure are described in U.S. Pat. No. 2,626,213.

It is also known that diluted asbestos dispersions may be converted into solid form by bringing a sheet, strand or other body of the dispersion into contact with an agent that renders the soap insoluble. In most commercial processes, the dispersion is passed through a nozzle or other forming channel and is brought into contact with an aqueous bath containing divalent or trivalent metal ions, such as calcium, magnesium, aluminum or the like. The metal ions react with the surfactant and cause the dispersion to be converted into a solid strand. The strand may be produced continuously and may be collected in a package such as by pot spinning. The package is then dried, cleaned to remove the insoluble soap residue, and then may be woven into a fabric or utilized in other applications. Typical processes are described in the following U.S. Pat. Nos. 2,972,221; 3,475,894; 3,608,294; 3,676,038; 3,634,568; and 3,806,572.

After the sheet or strand has been subjected to the precipitating agent, and up to the time of cleaning, several intervening operations take place that may result in the generation of waste. For example, the strand may break during the collection, winding, twisting, weaving or beaming operations, resulting in losses of asbestos mineral fibers which heretofore had to be disposed of in according with hazardous materials disposal regulations.

Such waste asbestos containing the insoluble soap, resulted in a direct loss to production efficiency and a gain in product cost. Also, since asbestos dust is considered dangerous to human health, proper disposal of the waste over a period of time can present serious difficulties to the producer.

According, the provision of a suitable and reliable method of converting such asbestos waste into a form suitable for reprocessing is highly desirable.

SUMMARY OF THE INVENTION

In accordance with the present invention, asbestos waste containing water insoluble soaps, are first treated with an inorganic acid, which releases and solubilizes the precipitating ions from the soap. The resulting mass, consisting of insoluble asbestos and a fatty acid, is water washed and then mixed with an alkali, such as sodium, potassium or ammonium hydroxide, to convert the acid to the soluble salt, causing an asbestos dispersion to be formed. The resulting dispersion, after being properly diluted, may be incorporated back into the regular batch of dispersion used in the commercial process.

DESCRIPTION OF THE PREFERRED EMBODIMENT

The present invention is utilized in connection with a process in which asbestos is first converted into a dispersion form, and the dispersion is shaped into a definite form while the dispersant is being inactivated to form a solid asbestos body.

As described in U.S. Pat. No. 3,806,572, incorporated herein by reference, a dilute dispersion or aqueous colloid of asbestos is formed, preferably by mixing or pulping in an aqueous solution containing about 15 to about 35 percent by weight of a water soluble salt of a fatty acid, such as sodium stearate or sodium, potassium and ammonium linoleates, oleates, elaidates, linolenates and combinations thereof.

The aqueous colloid, having a fiber content of from about 0.5 to about 10 percent is gravity fed through one or a plurality of nozzle orifices into an aqueous bath containing aluminum, zinc, calcium or magnesium ions. The dispersion is thereby converted into one or more strands, which are rapidly pulled away from the nozzles. The strands are combined and removed from the bath and then passed through a zone of low tension wherein the final stages of coagulation can take place; whereafter the combined strands are withdrawn as a single end under tension, for example by pot spinning. The resulting yarn is then subjected to further textile processing, i.e. spinning, beaming, weaving, braiding, cleaning, etc.

As hereinbefore mentioned, the above-described process may result in the generation of a significant amount of waste, due to breakage of the yarn between the initial forming stage and the cleaning stage. The waste product, consisting essentially of asbestos and precipitated soap, was heretofore considered useless and was simply discarded. Significant amounts of waste result in higher product costs, especially in view of the fact that high grade chrysotile asbestos, which is preferably used in dispersion processes, is a limited resource. Moreover, since inhalation of asbestos dust is considered as harmful to humans, suitable precautions must be taken in the disposal of the waste, thus further increasing production costs.

The present invention is particularly suitable for use in connection with strands, yarns and sheets of asbestos waste containing a precipitated fatty acid soap. The types of soaps commonly used in a dispersion process are soluble salts of fatty acids, such as sodium, potassium or ammonium stearate, linoleate, elaidate, linolenate or oleate, although others may be employed as described in U.S. Pat. No. 2,626,213. The primary criteria is that the soap or surface active agent is initially water soluble and can be converted into insoluble form by reaction with di- or trivalent heavy metal ions such as calcium, zinc, magnesium or aluminum.

The waste asbestos to be reconverted is preferably free of foreign materials that would be reactive with the reagents used in the recovery process. Yarn containing a wire insert, for example, would not be suitable for conversion, although the presence of relatively short fibers or fillers of unreactive materials such as carbon, graphite or glass would not be detrimental to the recovery process.

In accordance with the present invention, a batch of the waste asbestos containing the precipitated soap is first mixed with a dilute inorganic acid, such as sulfuric, hydrochloric or nitric. The waste asbestos is preferably intimately mixed with the acidic water solution, in order to convert the water insoluble heavy metal salt into a water insoluble organic acid and to solubilize the heavy metal ions. In a typical reaction, for example, hydrochloric acid would be reacted with zinc elaidate adhered on the waste asbestos to form insoluble elaidic acid and soluble zinc chloride.

The thus treated yarns are then thoroughly washed to remove substantially all of the heavy metal ions. The yarn loses its previously solidified state, forms a spongy mass and the washing step preferably terminates in one or more dewatering operations. For example, residual water may be removed by means of a screw press or centrifuge to approximately 30-70% solids.

The washed and dewatered mass is then reacted with a reagent capable of converting the insoluble fatty acid into a soluble salt. Sodium hydroxide is preferably used for this purpose, although other hydroxides such as potassium or ammonium may be beneficially employed. For example, if the waste yarn contains elaidic acid, sodium hydroxide may be used, resulting in a reaction product of water soluble sodium elaidate and water. The acid and alkali reactions are preferably carried out in a mixing or beating vessel such as a hydrapulper, which results in the simultaneous reconversion of the asbestos yarn into an aqueous colloid.

The quantities of acid and alkali to be used may be easily determined, since the amount of soap in the waste product is known. Preferably, a slight excess of acid is used to assure a complete reaction. A mole equivalent weight of alkali is utilized, and the exact amount to be added can be determined by matching the final pH of the converted waste colloid to the pH of the colloid then being utilized in the commercial process. Sufficient water is also added to the converted waste to match the dilution of the main batch.

The recoverted waste may then be added to a mixer or hydrapulper containing fresh asbestos and surfactant, such that all reconverted waste is recovered and utilized. It has been found that up to 50% of the entire final batch may comprise recovered waste without detriment to the commercial process. The resulting batch may then be processed in the normal manner as hereinbefore described.

EXAMPLE

A sample of 100 pounds of yarn containing 10% contamination was reacted with 200 gallons of dilute (0.125%) hydrochloric acid for 30 minutes in a commercial washing machine. Excess liquid was then squeezed out in a press. The resulting mass was washed for 2 cycles in tap water. The washed mass was then reacted with dilute (0.08%) sodium hydroxide for 30 minutes in a hydrapulper. The resulting mix was then added to and pulped with regular fiber and utilized to make asbestos products.

We claim:

1. In connection with a process wherein the asbestos in a dispersion of an asbestos aqueous colloid containing a soluble surfactant is converted into a solid body by reaction with a heavy metal ion to render the surfactant insoluble, a process for recovering asbestos waste containing precipitated surfactant comprising the steps of: acidifying the waste by the addition of a dilute inorganic acid to solubilize the heavy metal ions, washing the waste to remove the heavy metal ions, converting the precipitated insoluble surfactant in said waste into a water soluble surfactant by reaction with an inorganic alkali, and returning the asbestos and soluble surfactant to said dispersion for reprocessing.

2. The process of claim 1 wherein the colloid is formed with a surfactant consisting of at least one salt of a fatty acid, said fatty acid being insoluble in water and the salt thereof being soluble.

3. The process of claim 1 wherein the heavy metal ions are selected from the group consisting of calcium, magnesium, aluminum, zinc and mixtures thereof.

4. The process of claim 1 wherein the waste is acidified with hydrochloric acid.

5. The process of claim 1 wherein the waste is pressed to remove excess water after washing.

6. The process of claim 1 wherein said inorganic alkali is sodium hydroxide.

* * * * *